United States Patent [19]
Witt

[11] Patent Number: 6,157,986
[45] Date of Patent: *Dec. 5, 2000

[54] FAST LINEAR TAG VALIDATION UNIT FOR USE IN MICROPROCESSOR

[75] Inventor: David B. Witt, Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/991,908

[22] Filed: Dec. 16, 1997

[51] Int. Cl.⁷ ..................................................... G06F 12/00
[52] U.S. Cl. .......................... 711/118; 711/144; 711/205; 711/207; 712/200; 712/218; 712/239
[58] Field of Search ..................................... 711/118, 205, 711/200, 218; 712/200, 218, 239

[56] References Cited

U.S. PATENT DOCUMENTS

| | | |
|---|---|---|
| 4,044,338 | 8/1977 | Wolf .......................................... 365/49 |
| 4,453,212 | 6/1984 | Gaither et al. . |
| 4,680,700 | 7/1987 | Hester et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson ................................... 712/239 |
| 5,226,126 | 7/1993 | McFarland et al. ..................... 712/218 |
| 5,226,130 | 7/1993 | Favor et al. . |
| 5,239,635 | 8/1993 | Stewart et al. ........................... 711/206 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," 1994, pp. 2–1 through 2–4.

Michael Slater, "AMD's K5 Designed to Outrun Pentium," Microprocessor Report, vol. 8, No. 14, Oct. 24, 1994, 7 pages.

(List continued on next page.)

*Primary Examiner*—Do Hyun Yoo
*Assistant Examiner*—Nasser Moazzami
*Attorney, Agent, or Firm*—Conley, Rose & Tayon, PC; Lawrence J. Merkel

[57] ABSTRACT

A linearly addressed cache capable of fast linear tag validation after a context switch or a translation lookaside buffer (TLB) flush. The cache is configured to validate multiple linear address tags to improve performance in systems which experience frequent context switches or TLB flushes. The cache comprises: a data array configured to store a plurality of cache lines, a linear tag array, a physical tag array, and a TLB. Each array is configured to receive a portion of a requested address. Each linear tag stored in the linear tag array corresponds to one cache line stored within the data array. Each physical tag stored in the physical tag array also corresponds to one cache line stored within the data array. The TLB is configured to store linear to physical address translations, while the linear tag array is configured to store status information for each linear tag. The status information comprises a linear tag valid bit and an enable compare bit. The linear tag array is configured as a content addressable memory and is configured to perform a parallel comparison of a first portion of the requested address with each of the plurality of stored linear tags. If one of the tags match, the linear tag array sets the corresponding valid bits if the corresponding enable compare bits are set. The linear tag array may also be configured to clear the enable compare bits in parallel.

18 Claims, 7 Drawing Sheets

U.S. PATENT DOCUMENTS

| | | |
|---|---|---|
| 5,349,651 | 9/1994 | Hetherington et al. ................. 711/207 |
| 5,428,757 | 6/1995 | Sutton ..................................... 709/107 |
| 5,481,689 | 1/1996 | Stamm et al. . |
| 5,623,619 | 4/1997 | Witt ............................................ 711/3 |
| 5,630,088 | 5/1997 | Gupta et al. ............................ 711/207 |
| 5,651,125 | 7/1997 | Witt et al. . |
| 5,664,139 | 9/1997 | Spurlock ................................ 711/202 |
| 5,712,998 | 1/1998 | Rosen ..................................... 711/205 |
| 5,721,858 | 2/1998 | White et al. ............................ 711/203 |
| 5,764,938 | 6/1998 | White et al. ............................ 712/200 |
| 5,900,022 | 5/1999 | Kranich ................................... 711/205 |

OTHER PUBLICATIONS

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

"*Intel Architecture Software Developer's Manual, vol. 1: Basic Architecture*", Intel Corporation, Prospect IL, 1996, 1997, Chapter 8: Programming With The Intel MMX™ Technology, pp 8–1 through 8–15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm).

Hennessy and Patterson, "Computer Architecture: A Quantitative Approach" Morgan Kaufman Publishers, 1990, pp. 437–445.

FAST LINEAR TAG VALIDATION UNIT FOR USE IN MICROPROCESSOR

BACKGROUND OF THE INVENTION

1. Field of the Invention

This invention relates to the field of microprocessors and, more particularly, to tag validation for linearly addressed caches used in microprocessors.

2. Description of the Related Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor perform their intended functions. At the end of a clock cycle, the resulting values are moved to the next pipeline stage.

Since superscalar microprocessors execute multiple instructions per clock cycle and the clock cycle is short, a low latency memory system is required to provide instructions to the superscalar microprocessor (i.e., a memory system that can provide a large number of bytes in a short period of time). Without a low latency memory system, the microprocessor would spend a large number of clock cycles waiting for instructions to be provided and then would execute the received instructions in a relatively small number of clock cycles. Overall performance would be degraded by the large number of idle clock cycles. However, superscalar microprocessors are ordinarily configured into computer systems with a large main memory composed of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells form a memory system that provides a relatively small number of bytes in a relatively long period of time, i.e., a high latency memory system.

Because superscalar microprocessors are typically not configured into computer systems with memory systems having sufficient bandwidth to continuously provide instructions and data for execution, superscalar microprocessors are often configured with caches. Caches are small, fast memories that are either included on the same monolithic chip with the microprocessor core, or are coupled nearby. Typically, data and instructions that have recently been used by the microprocessor are stored in these caches and are later written back to memory (if modified) or discarded after the instructions and data have not been accessed by the microprocessor for some time. The amount of time necessary before instructions and data are vacated from the cache and the particular algorithm used therein varies significantly among microprocessor designs and are well known. Data and instructions may be stored in a shared cache (referred to as a combined or unified cache). Also, data and instructions may be stored in distinctly separated caches, typically referred to as an instruction cache and a data cache.

Retrieving data from main memory is typically performed in superscalar microprocessors through the use of a load instruction. The load instruction may be explicit, wherein the load instruction is actually coded into the software being executed, or implicit, wherein some other instruction (an add, for example) directly requests the contents of a memory location as part of its input operands. Storing the results of instructions back to main memory is typically performed through the use of a store instruction. As with the aforementioned load instruction, the store instruction may be explicit or implicit. As used herein, "memory operations" will be used to refer to both load and store instructions.

In modern superscalar microprocessors, memory operations are typically executed in one or more load/store units. These units execute the instruction, access the data cache (if one exists) attempting to find the requested data, and handle the result of the access. As described above, data cache access typically has one of two results: a miss or a hit.

To increase the percentage of hits, many superscalar microprocessors use caches organized into "set-associative" structures. In a set-associative structure, the cache is configured into two parts, a data array and a tag array. Both arrays are two-dimensional and are organized into rows and columns. The column is typically referred to as the "way," while the row is typically referred to as the "set." Thus a four-way set-associative cache would be configured with four columns. A set-associative cache is accessed by specifying a row in the data array and then examining the tags in the corresponding row of the tag array. For example, when the load/store unit searches the data cache for data residing at a particular address, a number of bits from the address are used as an "index" into the cache. The index selects a particular row within the data array and a corresponding row within the tag array. The number of address bits required for the index are thus determined by the number of rows configured into the cache. The tags stored within the selected row are examined to determine if any match the requested address. The term "tag" refers to a portion of an address, e.g., the most significant bits of an address. More particularly, the tag is the remaining portion of the address after removing the index and offset portions. If a match is found, the access is said to be a "hit" and the data cache provides the associated data bytes from the data array. If a match is not found, the access is said to be a "miss." When a miss is detected, the load/store unit causes the requested data bytes to be transferred from the memory system into the data array. The address (or the tag portion of the address) associated with the data bytes is stored in the tag array.

Another factor that somewhat complicates the operation of a cache is paging. Paging breaks up the linear address space into fixed blocks called pages. Pages allow a large linear address space to be implemented within a smaller physical memory. This configuration is referred to as "virtual memory." Paging allows virtual memory to be implemented by managing memory in pages that are swapped to and from disk. The swapping is typically invisible to the application program. Turning now to FIG. 1, a diagram is shown illustrating how a linear address is translated to a physical address using paging. Typically, microprocessors use a translation lookaside buffer (TLB) to speed the translation of linear addresses to physical addresses. A TLB stores linear to physical address translations corresponding to a number of the most recently accessed page table entries (called "page frames"). When a page table request occurs, the TLB is checked to determine if it is storing the desired translation. While paging is a useful feature, it also has the unfortunate effect of slowing data cache accesses because of the extra time required to translate the linear addresses to a physical address. Thus a cache capable of fast access in a paged memory structure is desired.

Another set of complications relating to paging involve context switching and TLB flushing. A context switch occurs when the operating systems switches programs or tasks. When switching tasks, the microprocessor saves its current state information (i.e., register values) so that its state may be reloaded upon returning to the interrupted task. Of particular importance when changing tasks is that a new value may be loaded into the CR3 register. As illustrated in FIG. 1, the CR3 register selects the page directory to be used for linear to physical address translation. As each task may use a different page directory with different translations, the TLB is flushed after every context switch. Note that some operating systems also flush the TLB in other instances. Context switching and TLB flushes affect caches because all linear to physical address translations calculated before the context switch or TLB flush are typically invalidated because they may no longer be accurate if a new page directory was loaded.

As preemptive multi-tasking operating systems becoming more popular, recovery from context switches and TLB flushes are likely to become more important because multi-tasking, operating systems may require microprocessors to perform these tasks more frequently. Therefore, a cache capable of fast access in a paged memory structure and fast recovery from context switches and TLB flushes is desirable.

SUMMARY OF THE INVENTION

The problems outlined above are in large part solved by a cache configured in accordance with the present invention. Broadly speaking, the present invention contemplates a linearly addressed cache capable of fast linear tag validation after a context switch. Linear addressing may advantageously speed cache access times by removing the delay of linear to physical address translation. Furthermore, validating multiple linear address tags after a context switch may advantageously improve performance in systems which experience frequent context switches or TLB flushes.

In one embodiment, a cache having fast linear tag validation comprises: a data array configured to store a plurality of cache lines, a linear tag array, a physical tag array, and a translation lookaside buffer. Each array is configured to receive a portion of a requested address. Each linear tag stored in the linear tag array corresponds to one cache line stored within the data array. Similarly, each physical tag stored in the physical tag array also corresponds to one cache line stored within the data array. The translation lookaside buffer is configured to store linear to physical translations, while the linear tag array is configured to store status information for each linear tag. The status information may comprise a linear tag valid bit. The linear tag array is also configured to compare a first portion of the requested address with each of the plurality of stored linear tags. If any tags match, the linear tag array sets the corresponding valid bits.

In another embodiment, a microprocessor capable of fast linear tag validation comprises a load/store unit and a cache coupled to the load store unit. The cache comprises a data array and a linear tag array. The data array comprises a plurality of data storage locations and is configured to receive a first portion of a requested address. In response, the data array is configured to output the contents of a subset of the plurality of data storage locations. The linear tag array is further configured as a content addressable memory able to store a plurality of linear tags and valid information, wherein each linear tag is associated with one of the plurality of data storage locations. In one embodiment, the microprocessor further comprises a physical tag array configured to store a plurality of physical tags, each associated with one of the data storage locations. In addition, the cache is configured to validate a particular set of linear tags in parallel in response to receiving a particular portion of a particular requested address.

A method for fast linear tag validation is also contemplated. In one embodiment, the method comprises maintaining status information for a plurality of stored linear tags. The plurality of stored linear tags are used to access a linearly addressed cache. The method also comprises detecting a requested address that meets a first set of criteria. The first set of criteria comprises matching one of the stored linear tags that has an invalid status and matching one of a plurality of stored physical tags. The physical tags correspond to the contents of the linearly addressed cache. Finally, the method comprises setting the status information to valid for any stored linear address tags that match the requested address and meet the first set of criteria.

BRIEF DESCRIPTION OF THE DRAWINGS

Other objects and advantages of the invention will become apparent upon reading the following detailed description and upon reference to the accompanying drawings in which.

Figure 1:
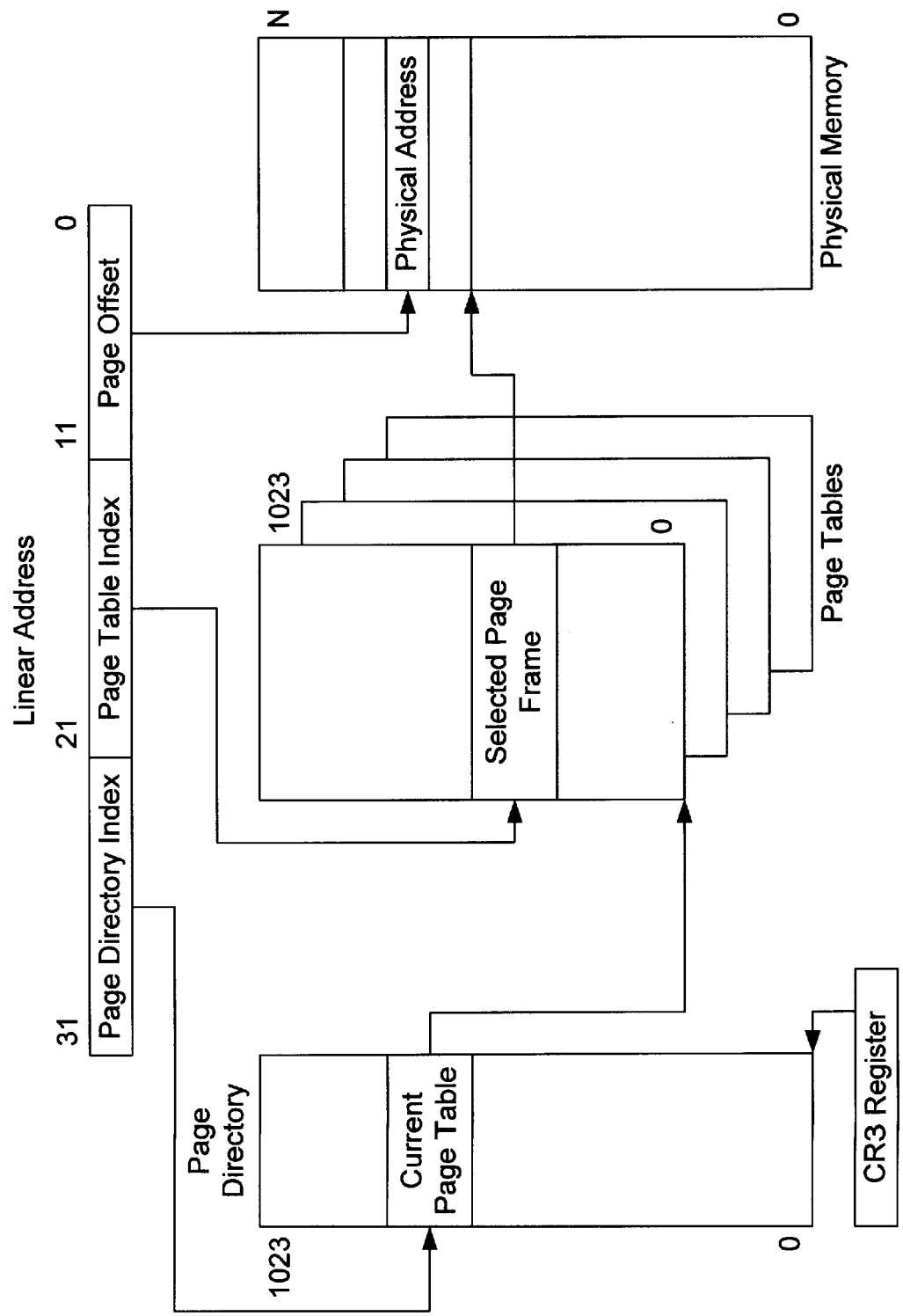
FIG. 1 is a diagram illustrating how a linear address may be translated to a physical address using paging.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
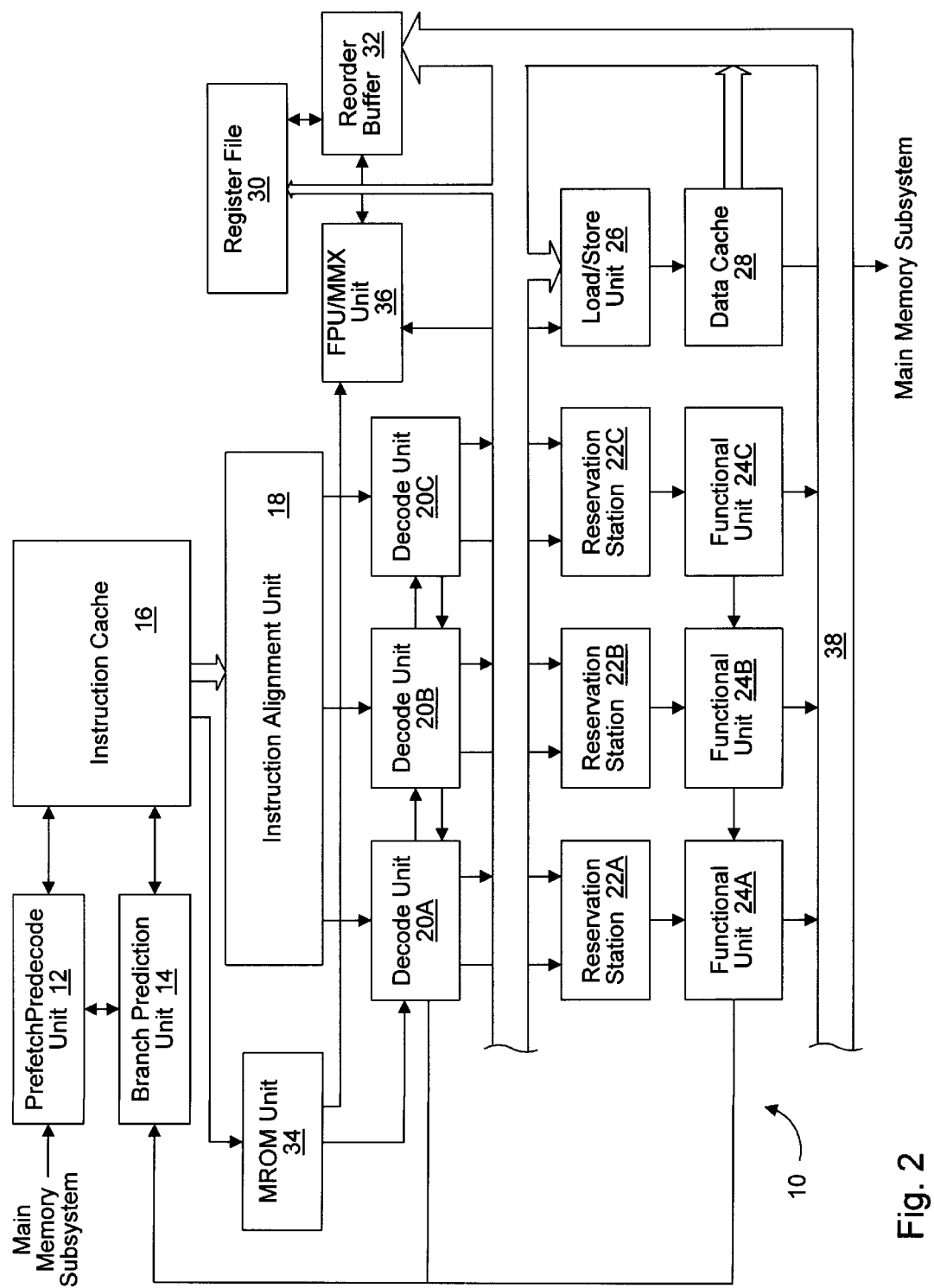
FIG. 2 is a block diagram of a superscalar microprocessor.

Turning now to FIG. 2, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20 and FPU/MMX unit 36.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 4 way set associative structure having 32 byte lines (a byte comprises 8 binary bits). Alternatively, 2 way set associativity may be employed as well as any other desired associativity. Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod RIM byte is set, then an SIB byte is present. Alternatively, if the functional bit for the Mod RIM byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20 or FPU/MMX unit 36 in the case of floating point instructions. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. If decode units 20 detect a floating point instruction, the instruction is dispatched to FPU/MMX unit 36.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that FPU/MMX unit 36 may be employed to accommodate floating point and multimedia operations. The floating, point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 3:
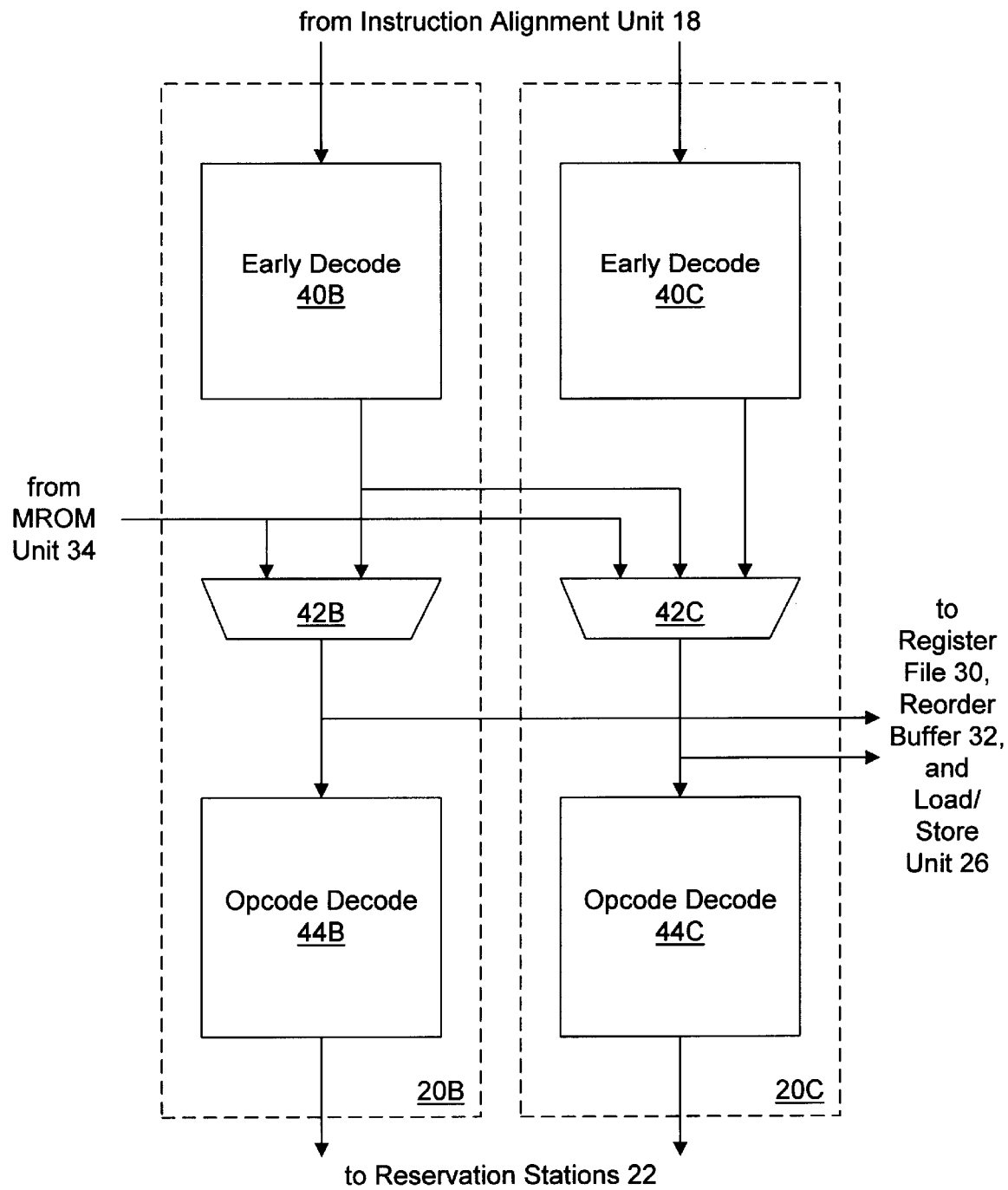
FIG. 3 is a block diagram of one embodiment of the decode units shown in FIG. 2.

Turning now to FIG. 3, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 4:
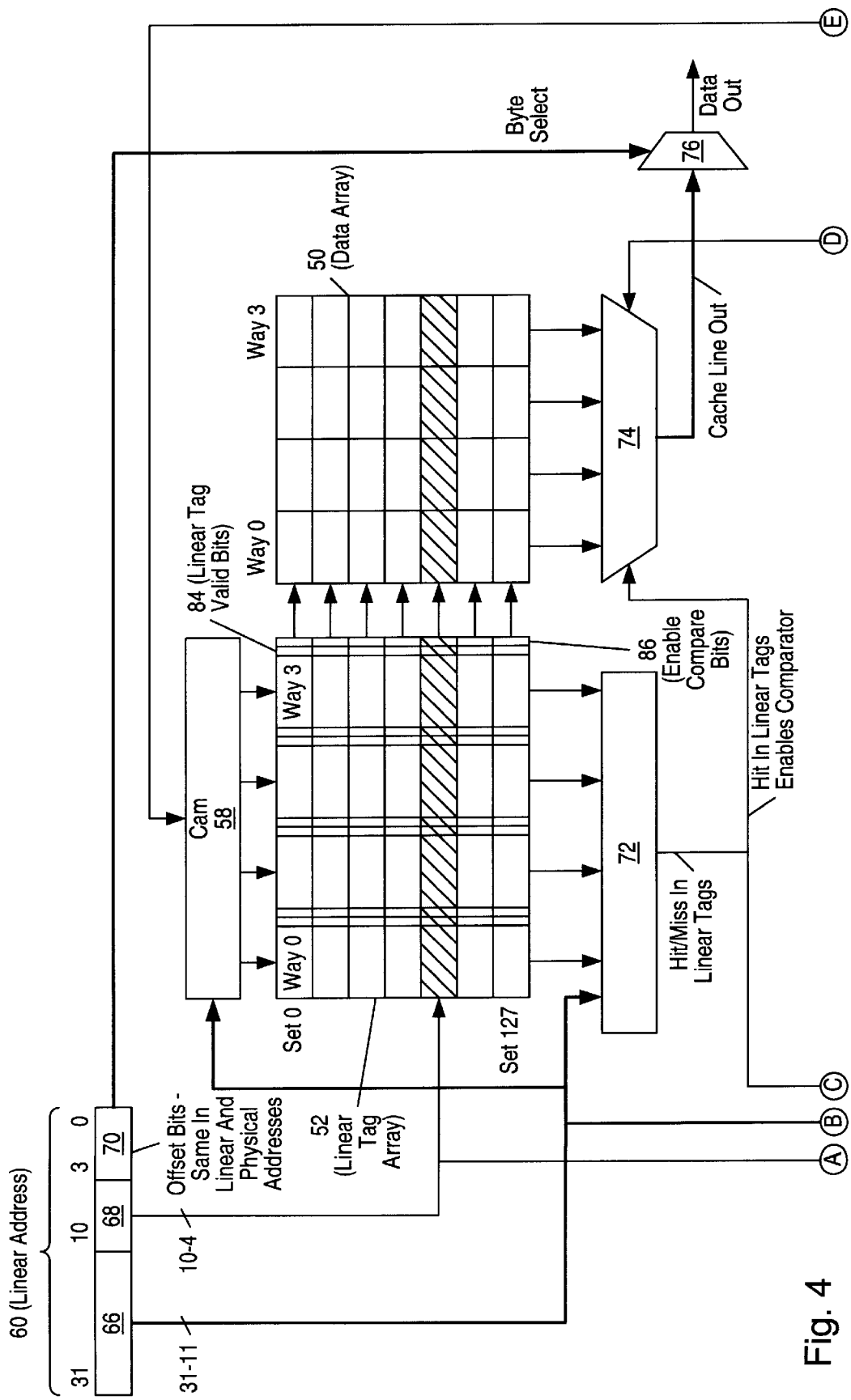
FIG. 4 is a diagram showing one embodiment of the data cache shown in FIG. 2.
Figure 4:
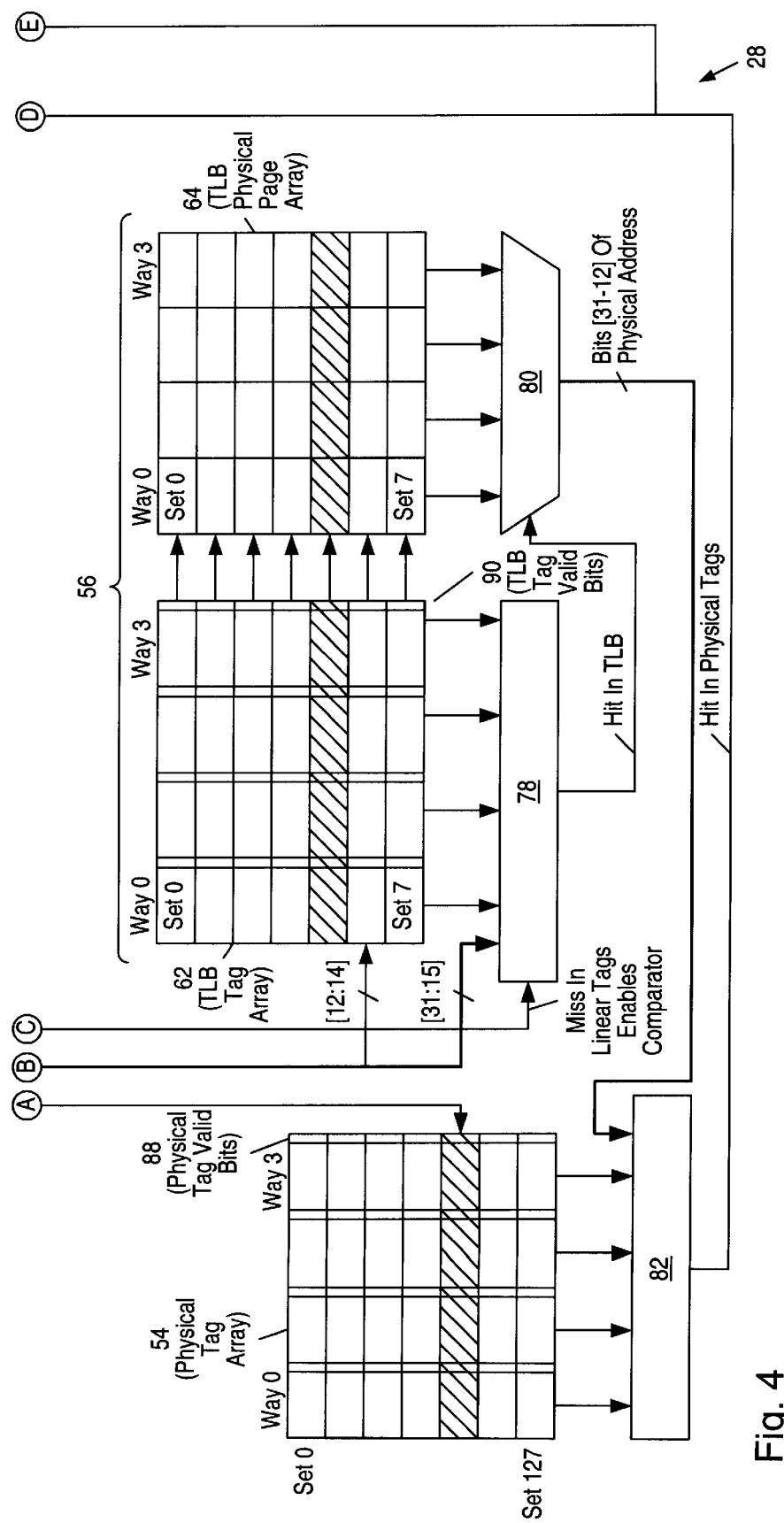

Turning next to FIG. 4, a diagram illustrating one embodiment of data cache 28 is shown. Data cache 28 comprises data array 50, linear tag array 52, physical tag array 54, and translation lookaside buffer (TLB) 56. Data array 50 is configured into multiple cache lines in a set-associative configuration. Linear tag array 52 is coupled to data array 50. Linear tag array 52 comprises a plurality of memory cells configured to store linear address tags and corresponding status information. Each linear address tag corresponds to a different cache line stored in data array 50. Physical tag array 54 comprises a plurality of memory cells configured to store physical address tags and corresponding status information. Each physical address tag also corresponds to a particular cache line within in data array 50 and a particular linear address tag stored in linear tag array 52. TLB 56, which is coupled to physical tag array 54 and linear tag array 52, comprises TLB tag array 62 and TLB physical page array 64. Linear tag array 52 and physical tag array 54 may be configured to have the same structure, i.e., the same number of ways and sets. TLB tag array 62 is configured to store linear address tags that correspond to the contents of physical page array 64. Physical page array 64 is configured to store linear to physical address translation information corresponding to a predetermined number of the most recently accessed page table entries (i.e., selected page frames). While all five arrays 50, 52, 54, 62, and 64 are shown as having four ways, other configurations are possible. Furthermore, TLB tag array 62 and physical page array 64 need not have the same configuration as the other arrays. For example, TLB 56 may be configured as direct mapped.

Data cache 28 operates by receiving requested linear address 60 from load/store unit 26. Requested linear address 60 comprises tag field 66, index field 68, and offset field 70. Tag field 66 may comprise the most significant bits of linear address 60. A portion of tag field 66 selects the page table to be used from the current page directory (as defined by the contents of the CR3 register; see FIG. 1). Tag field 66 is compared with the linear address tags stored in linear tag array 52 by comparator 72. Index field 68 is used by linear tag array 52 and physical tag array 54 to select a set (or row). Offset field 70 specifies the byte offset within the page. Linear tag array 52, data array 50, and physical tag array 54 each receive index field 68 as input to select a particular set (or row). For example, when linear tag array 52 receives index field 68, a particular set within linear tag array 52 is selected. The contents of each memory location within the selected row are then conveyed to comparator 72. In addition, comparator 72 also receives tag field 66 from linear address 60. Comparator 72 compares the contents of each memory location within the selected row to determine if there is a match with tag field 66. If there is a match, the access is said to "hit" in the linear tag array. Conversely, if there is no match, a "miss" in the linear tag array has occurred.

A hit selects the way (or column) in which the requested data is stored in data array 50. When a hit in linear tag array 52 occurs, a hit signal is conveyed to multiplexer 74 along with an indication of which way in data array 50 the requested data is stored in. In parallel with the selection of a set within linear tag array 52, a corresponding set is selected within data array 50 based upon index field 68. Multiplexer 74 is configured to select one cache line within the selected set in data array 50 based upon the indication of which way hit from comparator 72. Once multiplexer 74 has selected the correct way, the selected cache line is routed to multiplexer 76. Multiplexer 76 receives offset byte field 70 from request address 60 and selects the desired bytes from the cache line. Advantageously, storing linear tags for data array 50 allows for rapid access to the data in data array 50 since linear to physical memory address translation need not be performed to detect a hit.

If a requested address misses in linear tab array 52, the miss is signaled to comparator 78. Comparator 78 is coupled to TLB tag array 62. TLB tag array 62 receives a number of bits from offset field 66 of request address 60. Similar to the operation of linear tag array 52, TLB tag array 62 selects a row based the number of bits from offset field 66. If a miss signal is received from comparator 72, comparator 78 compares the contents of each memory location within the selected row to determine if there is a match with the bits from request address 60. If there is a match, there is said to be a hit in the TLB.

A hit in TLB 56 is signaled to multiplexer 80 along with an indication of the correct way. Similar to data array 50, TLB physical page array 64 is configured to select a set of entries in parallel with the TLB tag array 62 based upon the bits from request address 60. Multiplexer 80 is configured to select one linear to physical translation from the set of selected entries in response to the hit information from comparator 78 and convey the entry to comparator 82.

Comparator 82 is coupled to physical tag array 54, which receives index field 68 as input. Physical tag array 54 selects one set of physical tags for comparison with the selected linear to physical address translation from multiplexer 80. If comparator 82 determines that the translation and the physical tag are equal, then a hit in physical tag array 54 is signaled to multiplexer 74. A hit in the physical tags verifies that the data in data array 50 is the desired data, regardless of the linear address associated with it in linear tag array 52. Thus, multiplexer 74 is configured to output the selected cache line if there is a hit in physical tag array 54.

If there is a miss in TLB tag array 62, TLB 56 loads the appropriate linear to physical address translation from main memory The physical address translation is then compared to the set of physical address tags. If there is a miss in physical tag array 54, then a new cache line is allocated in data array 50 and the requested address is loaded into data array 50 from main memory.

Data cache 28 may be configured to allow only one translation of a linear address to physical address. Advantageously, this may prevent aliases and multiple copies of cache lines within data array 50. Furthermore, while the figures illustrate a data cache using fast tag validation, an instruction cache (or combined instruction and data cache) may also benefit from fast tag validation as disclosed herein.

Context switching

When a context switch is signaled (i.e., a write to the CR3 register) all internal registers of the currently executing task are saved and a new context is loaded. As the new context may have its own linear to physical address translation and its own set of pages, TLB tag array 62 and TLB physical page array 64 are flushed and linear tag valid bits 84 within linear tag array 52 are cleared. Note that pages marked as global may be retained as their linear to physical address translations are constant throughout all processes.

If a particular address is re-accessed after a context switch and its associated data is still cached, the linear tag matches but the corresponding cleared linear valid bit is detected. Prior to using the corresponding data from data array 50, the requested address is translated in order to determine whether the existing linear to physical address translation is valid. If the physical tags match the physical page generated from the physical translation, then the corresponding linear tag valid bit 84 is set and the entry is revalidated without having to access memory.

While this process may eliminate the need to access memory, individually revalidating each cache line may noticeably reduce performance if context switches occur frequently. Advantageously, linear tag array 52 further comprises a content addressable memory (CAM) 58 which is configured to set all linear valid bits within a given page in parallel. After a cache line is validated, all other cache lines on the same page may be validated in parallel This may eliminate the penalty for frequent context switches. Therefore, the overhead is just the one access of TLB 56 for all cache lines that hit on a particular page.

CAM 58 is built into linear tag array 52 and is configured receive a portion of a linear address as input. CAM 58 compares the address portion to all the linear address tags stored in linear tag array 52 upon a successful translation of linear address 60 (i.e., a hit in physical tag array 54) after detecting a cleared linear tag valid bit. Any tags that match have their corresponding linear tag valid bits 84 set. CAM 58 need not be used for the time-critical read access of linear tag array 52. Instead CAM 58 may be configured for used during the tag validation access. CAM 58 is configured to validate all linear address tags that match the last address that missed in linear tag array 52 having a context matching the last stored context of the page descriptor table in register CR3. Validation involves setting all linear tag valid bits 84 that correspond to linear address tags that match a portion of the last requested linear address 60 for which the linear tag valid bit is clear. CAM 58 may also be used to clear all enable compare bits 86 corresponding to a particular linear address stored in linear tag array 52 in parallel when a new page is brought in with the same linear address tag but a different mapping.

In one embodiment, linear tag array 52 contains CAM cells instead of RAM cells. The CAM cells may be configured to set or clear linear tag valid bits 84 in parallel. The CAM cells are configured to receive as input a portion of the last requested linear address 60 that detected a cleared linear tag valid bit 84. In this embodiment, linear tag array 52 further comprises an extra set of storage locations for storing enable compare bits 86. One enable compare bit 86 is stored for each tag. This bit controls whether or not the particular entry is enabled to be set or cleared in parallel. The ability to turn off the fast linear tag validation is desirable because some operating systems may not function properly when the fast tag validation is active. The present system is designed to execute operating systems such as WINDOWS95™ or WINDOWS NT™ and equivalents. For other operating systems the fast linear tag validation may be disabled if necessary for compatibility. The fast tag validation may be disabled simply by clearing all enable compare bits 86.

With the addition of the enable compare bit, each cache line stored within data array 50 has three corresponding status bits: a linear tag valid bit 84 (stored in linear tag array 52), an enable compare bit 84 (also stored in linear tag array 52), and a physical tag valid bit 88 (stored in physical tag array 54).

The following table illustrates the cache line status associated with different status bit states:

TABLE 1

| Linear Tag Valid Bit | Physical Tag Valid Bit | Enable Compare Bit | Status of Cache Line |
|---|---|---|---|
| 0 | 0 | 0 | Cache line not allocated. |
| 0 | 0 | 1 | Linear and physical tags are invalid, but cache line will participate in parallel validation. |
| 0 | 1 | 0 | Linear tag invalid. Physical tag valid. This cache line will not participate in parallel validation. This cache line must be validated individually. |
| 0 | 1 | 1 | Physical tag valid. This cache line will participate in a parallel validation. |
| 1 | 0 | 0 | This state is an error state because a physical tag should never be invalidated without also invalidating the associated linear tag. |
| 1 | 0 | 1 | This state is an error state because a physical tag should never be invalidated without also invalidating the associated linear tag. |
| 1 | 1 | 0 | Linear and physical tags valid, but cache line does not participate in parallel validation. This cache line must be validated individually. |
| 1 | 1 | 1 | Linear and physical tags valid. An access corresponding to this tag can hit in the linear tag array. |

Description of Cache Line States

Following are descriptions of the states a cache line may have according to one embodiment of data cache 28. The state of each cache line is determined by the values of its status bits.

Invalid Line

When a cache line is invalid, the cache line's linear tag valid bit 84 and physical tag valid bit 88 are both cleared.

Allocated line with Valid Translation

When a cache line is allocated and has a valid translation, the cache line's linear tag valid bit 84 and physical tag valid bit 88 are both set. This state allows a direct hit in the cache without accessing TLB 56 or physical tag array 54. It is noted that TLB 56 and physical tag array 54 may still need to be accessed in some configurations to update the cache line's status information when sharing data, e.g., under the MESI protocol.

Allocated Line with Invalid Translation

When a cache line is allocated but has an invalid translation, the cache line's linear tag valid bit 84 is cleared and the cache line's physical tag valid bit 88 is set. All cache lines are sent to this state after a context switch, but not on an individual page invalidation. Individual page invalidation may be handled by moving the linear tag associated with the invalidated page to the arrays during the invalidation and then clearing all linear valid bits that match the address with CAM 56. Note that the entire linear tag array 52 does not need to be cleared, but only the effected addresses.

Allocated Lines with Cleared Enable Compare Bits

If a cache line does not have its enable compare bit 86 set, then either the mode is not enabled or its context has been reused. Either way, it does not participate in parallel setting of linear tag valid bit 84. In these cases the cache line is treated as an individual entry that accesses the TLB before it is validated, and is cleared with context switches or page invalidations. Data cache 28 may be configured not to perform a fast tag validation if the requested address maps to an allocated line with a cleared enable compare bit.

When a context switch occurs, linear tag valid bits 84 are cleared because the validity of their linear to physical address translation is no longer known. When a requested address is received after a context switch, the appropriate page frame for the new context is brought into TLB 56. Using the appropriate linear to physical address translation, physical tag array 54 is searched. If the physical address hits in physical tag array 54, then the corresponding linear address tags in linear tag array 52 that are in the same page as the requested address and have set enable compare bits 86 are validated.

If, on the other hand, the physical address misses in physical tag array 54, the linear addresses in linear tag array 52 that are in the same page as the requested address have incorrect translations for the current context. As a result, linear addresses that are in the same page as the requested address are prevented from validating in parallel. In this case, CAM 58 clears the enable compare bits 86 that correspond to linear address tags having cleared linear tag valid bits 84 and that are on the same page as the requested address. Once the enable compare bit 86 is cleared, the corresponding linear address tag may no longer be validated in parallel. These tags must then be individually validated by accesses TLB 56 each time to get a valid translation.

Tables 2–6 below illustrate exemplary operation of one embodiment of data cache 28 as it experiences several context switches.

TABLE 2

| | Time 0 | | | | | | |
|---|---|---|---|---|---|---|---|
| Linear Tag Array | | | Physical Tag Array | | TLB | | |
| Linear Tag | Tag Valid Bit | Enable Compare | Physical Tag | Physical Tag Valid Bit | Real Page # | TLB Tag | TLB Tag Valid |
| A + 1 | 1 | 1 | Z + A + 1 | 1 | Z | A | 1 |
| x | 0 | 0 | x | 0 | x | x | 0 |
| x | 0 | 0 | x | 0 | x | x | 0 |
| x | 0 | 0 | x | 0 | x | x | 0 |
| x | 0 | 0 | x | 0 | | | |

Table 2 illustrates the state of linear tag array 52, physical tag array 54, and TLB 56 at an arbitrary time, Time 0. Time 0 is immediately after data cache 28 has completed processed a first requested address (A+1). Upon receiving the requested address (A+1), linear address array 52 determines that the linear tag valid bit 84 for the matching linear address tag is not set. Then a TLB miss occurs, and the requested address also misses in physical tag array 54. As a result, CAM 58 disables the enable compare bits on matching entries where linear tag valid bit 84 is not set. The requested address causes a new cache line to be loaded from memory, and the new cache line's corresponding linear tag valid bit is set, as is the corresponding enable compare bit 86. The status after the first access has been processed is shown in Table 2.

TABLE 3

Time 100

| | Linear Tag Array | | Physical Tag Array | | TLB | | |
|---|---|---|---|---|---|---|---|
| Linear Tag | Tag Valid Bit | Enable Compare | Physical Tag | Physical Tag Valid Bit | Real Page # | TLB Tag | TLB Tag Valid |
| A + 1 | 1 | 1 | Z + A + 1 | 1 | Z | A | 1 |
| A + 2 | 1 | 1 | Z + A + 2 | 1 | x | x | 0 |
| x | 0 | 0 | x | 0 | Y | B | 1 |
| B + 4 | 1 | 1 | Y + B + 4 | 1 | x | x | 0 |
| B + 5 | 1 | 1 | Y + B + 5 | 1 | | | |

Table 3 illustrates the state of linear tag array 52, physical tag array 54, and TLB 56 at Time 100, one hundred clock cycles after Time 0. At Time 100, four cache lines are stored in data array 50. Their physical addresses cross two pages, thus two pages are stored in TLB 56. All four cache lines have their parallel enable compare bits 86 set. Accesses to the four cache lines would hit in linear tag array 52 without having to accesses TLB 56 or physical array 54.

If the first context switch takes place at Time 100, then the contents of TLB 56 are flushed (by clearing TLB tag valid bits 90) and linear valid bits 84 within linear tag array 62 are cleared. Note that enable compare bits 86 are not cleared. This state is illustrated in Table 4 below, which represents Time 101, one clock cycle after the first context switch.

TABLE 4

Time 101

| | Linear Tag Array | | Physical Tag Array | | TLB | | |
|---|---|---|---|---|---|---|---|
| Linear Tag | Tag Valid Bit | Enable Compare | Physical Tag | Physical Tag Valid Bit | Real Page # | TLB Tag | TLB Tag Valid |
| A + 1 | 0 | 1 | Z + A + 1 | 1 | Z | A | 0 |
| A + 2 | 0 | 1 | Z + A + 2 | 1 | x | x | 0 |
| C + 8 | 1 | 1 | Q + C + 8 | 1 | T | B | 0 |
| B + 4 | 0 | 1 | Y + B + 4 | 1 | Q | C | 1 |
| B + 5 | 0 | 1 | Y + B + 5 | 1 | | | |

As represented in table 4, the second context has been entered, TLB 56 has been flushed, and the first access in the new context (which was a new linear address that had been used before) has missed in linear tag array 52, TLB tag array 62, and physical tag array 54. Consequently, the requested address was loaded from memory and the corresponding linear tag valid bit was set. The first access is represented by linear tag "C+8" in Table 4.

One clock cycle later, Time 102, the context is switched back to the initial process and a linear address corresponding to linear tag "A+2" is requested. As the corresponding linear valid bit 84 is not set, TLB 56 loads the page frame and the requested address is found to hit in the physical tag array 54. As the compare enable bit 86 corresponding to the requested address is set, CAM 58 does a parallel compare of the entries in linear tag array 52. Any entries having virtual addresses corresponding to TLB tag "A" and a set enable compare bit 86 have their linear tag valid bits 86 set. This is illustrated below in Table 5. Note that the parallel setting of linear tag valid bits 84 may be performed independently of software. This is because there is only one valid set of linear mappings for a given context at any one time.

TABLE 5

Time 102

| | Linear Tag Array | | Physical Tag Array | | TLB | | |
|---|---|---|---|---|---|---|---|
| Linear Tag | Tag Valid Bit | Enable Compare | Physical Tag | Physical Tag Valid Bit | Real Page # | TLB Tag | TLB Tag Valid |
| A + 1 | 1 | 1 | Z + A + 1 | 1 | Z | A | 1 |
| A + 2 | 1 | 1 | Z + A + 2 | 1 | x | x | 0 |
| C + 8 | 0 | 1 | Q + C + 8 | 1 | Y | B | 0 |
| B + 4 | 0 | 1 | Y + B + 4 | 1 | Q | C | 0 |
| B + 5 | 0 | 1 | Y + B + 5 | 1 | | | |

At Time 103 a third context switch occurs. The switch is to a context with different physical locations in memory for the same linear addresses of the previous context. The TLB is once again flushed by clearing TLB tag valid bits 90. Next, at Time 104 a memory access requesting linear address "B+8" occurs. While the requested address matches a linear tag stored in linear tag array 52, the request misses in linear tag array 52 because the matching tags corresponding linear tag valid bit was not set. The requested address also misses in TLB 56 because it has been flushed. Thus a new page is loaded from memory. Using the new page, the requested address misses in physical tag array 54. As a result, CAM 56 clears all compare enable bits corresponding to the requested address, and the requested address is loaded from memory. The state of the arrays after the load is shown in Table 6.

TABLE 6

Time 104

| | Linear Tag Array | | Physical Tag Array | | TLB | | |
|---|---|---|---|---|---|---|---|
| Linear Tag | Tag Valid Bit | Enable Compare | Physical Tag | Physical Tag Valid Bit | Real Page # | TLB Tag | TLB Tag Valid |
| A + 1 | 1 | 1 | Z + A + 1 | 1 | Z | A | 0 |
| A + 2 | 1 | 1 | Z + A + 2 | 1 | x | x | 0 |
| B + 8 | 1 | 1 | T + B + 8 | 1 | T | B | 1 |
| B + 4 | 0 | 0 | Y + B + 4 | 1 | Q | C | 0 |
| B + 5 | 0 | 0 | Y + B + 5 | 1 | | | |

As this example illustrates, the enable compare bits in linear tag array 52 are cleared when a requested address misses in physical tag array 54 after a TLB page load. The enable bits are also cleared in the event of a context switch back to a previous context and a memory access requesting an address that is not cached and a page that is not in TLB 56. Both of these events will trigger a clearing of enable bits that match the requested linear address (except for those having set linear valid bits). As previously noted, clearing the enable bits ensures that only linear tags corresponding to a current page in TLB 56 (i.e., having a correct linear to physical translation for the current context) will be validated in parallel. Clearing enable compare bits 86 may be performed using the same path and hardware used to set linear tag valid bits 84. The linear address that missed in TLB 56 and physical tag array 54 may be used by CAM 58 to clear all enable bits having matching linear addresses.

In one embodiment, data cache 28 may be optimized to perform fast linear tag validation when the operating system flushes the TLB and invalidates the linear translations without a context switch. Data cache 28 may be configured to detect a non-context switch TLB flush because the value in the CR3 register will no be changes.

In another embodiment of data cache 28, the compare enable bits may be configured to reset themselves. For example, when an entry's linear tag valid bit 84 is set, its enable compare bit 86 may also be set at the same time if TLB 56 is storing a corresponding page. The presence of a corresponding page in TLB 56 indicates that a clearing of enable bits 86 has already taken place. Thus, the entry is currently in the valid linear address window of the current context and may therefore re-validate itself for later parallel validation.

Figure 5:
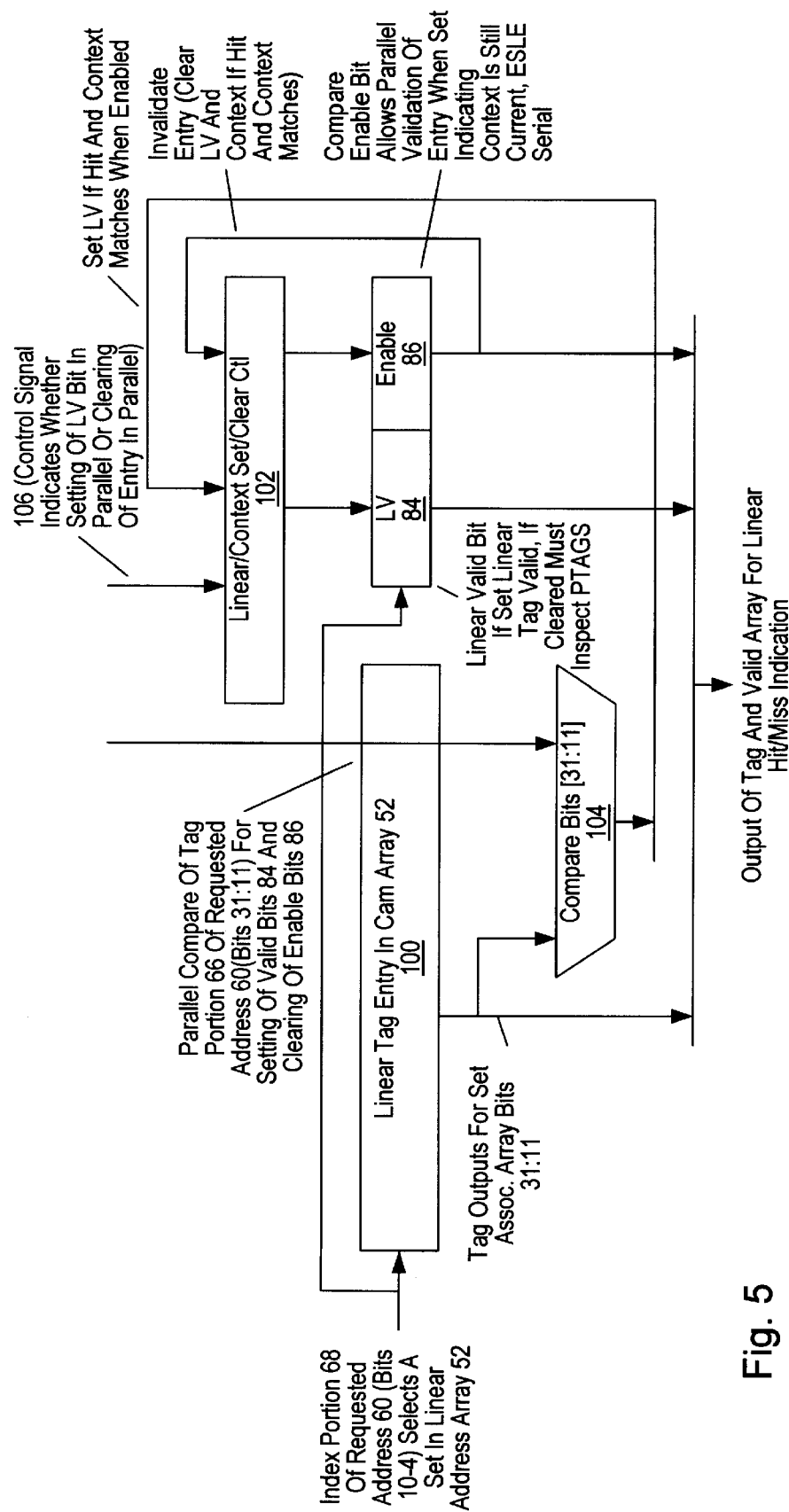
FIG. 5 is a diagram illustrating one embodiment of the CAM structure used in the data cache of FIG. 4.
Figure 6:
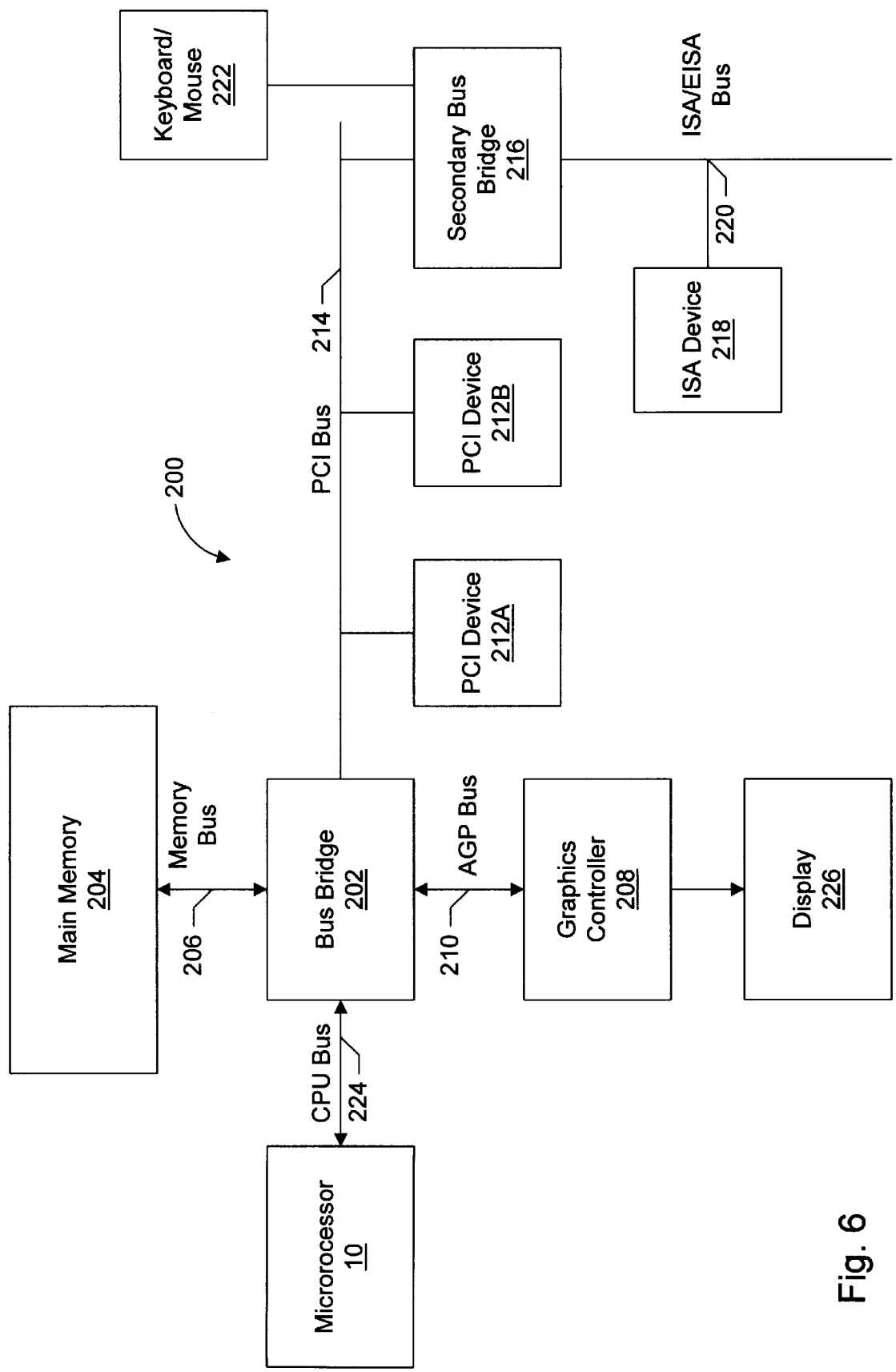
FIG. 6 is a block diagram of a computer system configured to utilize the microprocessor of FIG. 2.

Turning now to FIG. 5, detail of one embodiment of an entry within CAM 58 and linear tag array 52 is shown. CAM 58 comprises control unit 102 and comparator 104. As illustrated in FIG. 5, each linear tag entry 100 may be accessed using two different methods. The first method is used when reading the linear address tag. Linear tag entry 100 is accessed by selecting a set in linear tag array 52 with index portion 68 of the requested address. The second method is used to set linear tag valid bits 84 in parallel and to clear the enable compare bits 86 in parallel. CAM 58 compares the address portion used for setting/clearing with each linear tag entry 100 in parallel using comparator 104. Any matches are sent to control unit 102 which is coupled to linear tag valid bit 84 and enable compare bit 86. Control unit 102 receives a control signal 106 indicating whether linear valid bits 84 are to be set or compare enable bits 86 are to be cleared. In either case, control unit 102 performs the desired setting or clearing on each entry that corresponds to the controlling address portion. However, if setting of valid bits 84 is required, control unit 102 only sets linear valid bits 84 that have set enable compare bits 86.

Turning, now to Fig,. 6, a block diagram of a computer system 200 including microprocessor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

In addition to providing an interface to an ISA/EISA bus, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bridge logic unit 102 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 302 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc. It is noted that, while the AGP, PCI, and ISA or EISA buses have been used as examples in the above description, any bus architectures may be substituted as desired.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 7 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |

TABLE 7-continued x86 Fast Path, Double Dispatch, and MROM Instructions

| X86 Instruction | Instruction Category |
|---|---|
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |

TABLE 7-continued x86 Fast Path, Double Dispatch, and MROM Instructions

| X86 Instruction | Instruction Category |
|---|---|
| XLATB | fast path |
| XOR | fast path |

Note: Instructions including an SIB byte are also considered double dispatch instructions.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A cache having fast linear tag validation comprising:

a data array configured to store a plurality of cache lines;

a linear tag array configured to store a plurality of linear tags with corresponding linear tag valid bits, wherein each linear tag corresponds to one cache line stored within the data array;

a physical tag array configured to store physical tags corresponding to the contents of the data array; and a translation lookaside buffer configured to store linear to physical address translations, wherein the data array, the linear tag array, the physical tag array and the translation lookaside buffer are each coupled to receive a portion of a requested address, wherein the linear tag array is configured to compare a first portion of the requested address with each of the plurality of stored linear tags and validate all linear tags that correspond to the first portion of the requested address, wherein the linear tag array further comprises a content addressable memory configured to receive and compare a portion of the requested address with each of the plurality of stored linear tags in parallel, wherein the content addressable memory is configured to validate all linear tags in parallel that correspond to the first portion of the requested address.

2. The cache as recited in claim 1, wherein the content addressable memory is configured to validate all linear tags in parallel that correspond to the first portion of the requested address by setting one or more linear tag valid bits that correspond to linear tags that match the first portion of the requested address.

3. A cache having fast linear tag validation comprising a data array configured to store a plurality of cache lines;

a linear tag array configured to store a plurality of linear tags, wherein each linear tag corresponds to one cache line stored within the data array, wherein the linear tag array is configured to store status information for each linear tag, and wherein the status information comprises a linear tag valid bit;

a physical tag array configured to store physical tags corresponding to the contents of the data array; and a translation lookaside buffer configured to store linear to physical address translations, wherein the data array, the linear tag array, the physical tag array and the translation lookaside buffer are each coupled to receive a portion of a requested address, wherein the linear tag array is configured to compare a first portion of the requested address with each of the plurality of stored linear tags, wherein the linear tag array is configured to set one or more linear tag valid bits that correspond to linear tags that match the first portion of the requested address, wherein the linear tag array further comprises a content addressable memory, wherein the content addressable memory is configured to receive and compare a portion of the requested address with each of the plurality of stored linear tags in parallel, wherein the content addressable memory is configured to set one or more linear tag valid bits that correspond to linear tags that match the first portion of the requested address, wherein the status information further comprises an enable compare bit, wherein the content addressable memory is configured to set linear tag valid bits that correspond to linear tags that match the first portion of the requested address only if the corresponding enable compare bit is set.

4. The cache as recited in claim 2, wherein the content addressable memory is further configured to clear the enable compare bit for stored linear tags that match the first portion of the requested address if the requested address matches one or more stored linear tags having an invalid status and does not match any of the stored physical tags.

5. The cache as recited in claim 4, wherein the content addressable memory is further configured to reset the enable compare status bits for stored linear tags that match a particular requested address, wherein the particular requested address matches one of the stored linear tags that has an invalid status, and wherein the particular requested address also matches one of the stored physical tags.

6. A microprocessor capable of fast linear tag validation comprising:

a load/store unit configured to perform load and store operations; and a cache coupled to the load store unit comprising:

a physical tag array configured to store a plurality of physical tags, wherein each physical tag is associated with one of the plurality of data storage locations, and wherein the cache is configured to validate a particular set of linear tags in parallel after a context switch;

a data array comprising a plurality of data storage locations, wherein the data array is configured to receive a first portion of a requested address as an input and in response output the contents of a subset of the plurality of data storage locations, and a linear tag array configured to store a plurality of linear tags and valid information, wherein each linear tag is associated with one of the plurality of data storage locations, wherein the linear tag array is configured as a content addressable memory.

7. A microprocessor capable of fast linear tag validation comprising:

a load/store unit configured to perform load and store operations; and a cache coupled to the load store unit comprising:

a physical tag array configured to store a plurality of physical tags, wherein each physical tag is associated with one of the plurality of data storage locations, and wherein the cache is configured to validate a particular set of linear tags in parallel after a non-context switch TLB flush;

a data array comprising a plurality of data storage locations, wherein the data array is configured to receive a first portion of a requested address as an input and in response output the contents of a subset of the plurality of data storage locations, and a linear tag array configured to store a plurality of linear tags and valid information, wherein each linear tag is associated with one of the plurality of data storage locations, wherein the linear tag array is configured as a content addressable memory.

8. A microprocessor capable of fast linear tag validation comprising:

a load/store unit configured to perform load and store operations; and a cache coupled to the load store unit comprising:

a data array comprising a plurality of data storage locations, wherein the data array is configured to receive a first portion of a requested address as an input and in response output the contents of a subset of the plurality of data storage locations, and a linear tag array configured to store a plurality of linear tags and valid information, wherein each linear tag is associated with one of the plurality of data storage locations, wherein the linear tag array is configured as a content addressable memory, wherein the cache further comprises a physical tag array configured to store a plurality of physical tags, wherein each physical tag is associated with one of the plurality of data storage locations, and wherein the cache is configured to validate a particular set of linear tags in parallel after a context switch, and wherein the particular set comprises linear tags matching a second portion of the requested address.

9. The microprocessor as recited in claim 8 further comprising a translation lookaside buffer, wherein the valid information comprises a tag valid bit and an enable compare bit.

10. The microprocessor as recited in claim 9, wherein the linear tag array is configured to set one or more tag valid bits corresponding to linear tags that match a third portion of the requested address and have set enable bits.

11. The microprocessor as recited in claim 10, wherein the linear tag array is configured to set the tag valid bits in parallel.

12. The microprocessor as recited in claim 11, wherein the data array, the linear tag array, and the physical tag array are each configured to have the same number of ways and sets.

13. A method for fast linear tag validation comprising:

maintaining status information for a plurality of stored linear address tags, wherein the plurality of stored linear address tags are used to access a linearly addressed cache;

detecting a requested address that meets a first set of criteria, wherein the first set of criteria comprises:

matching one of the stored linear address tags that has an invalid status, and matching one of a plurality of stored physical address tags, wherein the plurality of stored physical address tags correspond to the contents of the linearly addressed cache; and setting the status information to valid in parallel for a plurality of stored linear address tags that match the requested address and meet the first set of criteria.

14. A method for fast linear tag validation comprising:

maintaining status information for a plurality of stored linear address tags, wherein the plurality of stored linear address tags are used to access a linearly addressed cache;

detecting a requested address that meets a first set of criteria, wherein the first set of criteria comprises:

matching one of the stored linear address tags that has an invalid status, and matching one of a plurality of stored physical address tags, wherein the plurality of stored physical address tags correspond to the contents of the linearly addressed cache; and setting the status information to valid for stored linear address tags that match the requested address and meet the first set of criteria; and maintaining compare enable status for the plurality of stored linear address tags, wherein said setting is performed only upon stored linear address tags having compare enable status that is enabled.

15. The method for fast linear tag validation as recited in claim 14 further comprising:

changing the compare enable status to disabled for stored linear address tags that correspond to the requested address that meets a second set of criteria, wherein the second set of criteria comprises:

matching one of the stored linear address tags having an invalid status, and not matching the plurality of stored physical address tags.

16. The method for fast linear tag validation as recited in claim 15, wherein said setting further comprises resetting the compare enable status to enabled for stored linear address tags that match the requested address and meet the first set of criteria.

17. The method for fast linear tag validation as recited in claim 16 wherein said setting is performed in parallel.

18. The method for fast linear tag validation as recited in claim 17 wherein said setting is performed once per clock cycle.

* * * * *